May 2, 1967  H. H. BARKER, JR., ET AL  3,317,074

CRYOGENIC CONTAINERS

Filed June 17, 1963

INVENTORS
HORACE H. BARKER JR.
RICHARD L. LONG
DANTE ROSELLO
GILBERT J. SOLDAT
THEODORE D. SMITH

BY

AGENT 3,317,074
CRYOGENIC CONTAINERS
Horace H. Barker, Jr., Los Angeles, Richard L. Long, Manhattan Beach, Dante Rosello, Long Beach, Gilbert J. Soldat, Woodland Hills, and Theodore D. Smith, Pacific Palisades, Calif., assignors to Douglas Aircraft Company, Inc., Santa Monica, Calif.
Filed June 17, 1963, Ser. No. 289,773
5 Claims. (Cl. 220—9)

This invention relates to insulated containers and more particularly to containers for holding cryogenic fluids or gases. The invention described herein was made in the preformance of work under a NASA contract and is subject to the provisions of the National Aeronautics and Space Act of 1958, Public Law 85–568 (72 STAT. 426; 42 U.S.C. 2451), as amended.

Typical insulated containers consist of a metal tank of sufficient thickness to serve as the major structural member of the container, on the outside of which is placed insulation such as a foam material. Such containers have several important disadvantages. One disadvantage is that they are easily damaged inasmuch as the insulation is exposed to accidental blows and other adverse conditions, and the best insulation materials are not strong mechanically. Another problem is that if the external insulation is not absolutely airtight, air which flows through cracks and openings to the metal tank wall contacts the extremely cold metal and freezes or becomes liquid, and serves to greatly increase heat transfer. Furthermore, if air is liquidfied, pure oxygen is often obtained which becomes a fire hazard. Another problem is that a heavy inner metal tank, which must be chilled prior to filling with cryogenic fluid to prevent excessive evaporation thereof, generally has a high heat capacity and requires the use of considerable chilling fluids. Still another problem is that the inner metal tank quickly conducts heat from any heat leak, such as that provided by a pipe or vent valve, to adjacent portions of the tank, thereby increasing the rate of heat conduction.

Many of the foregoing difficulties encountered in the use of external insulation are eliminated through the use of a metal shell of structural thickness with insulation bonded to its inside, so that the insulation itself forms a vessel for holding the cryogenic fluid while the outer metal tank or shell serves as a structural support. Although the use of insulation within a supporting structure eliminates many of the described problems, it creates others. One major difficulty encountered is that the materials with the best insulating properties do not possess sufficient strength to overcome the stresses of contraction and the inulation is likely to crack when suddenly cooled.

Another problem is the obtaining of a strong bond between the insulation material and the inner tank wall to prevent breaking away of the insulation under contraction stresses. Still another problem is preventing contamination of the contained fluid by insulation materials which are often friable or easily made into dust.

The present invention largely overcomes the difficulties encountered in the employment of insulation within a structural tank by providing a tough and flexible liner within the insulation and by employing tension threads or other supports of low heat conductivity extending through the insulation to tie the liner to the supporting, external metal shell. The invention is useful not only for closed containers such as tanks, but in pipes and other applications where an efficient and reliable insulation system is needed.

Accordingly one object of the present invention is to provide an insulated container for cryogenic liquids which is resistant to rough handling and other adverse external conditions.

Another object of the present invention is to provide a light weight container with internal insulation.

Another object of the present invention is to provide a container with internal insulation which can withstand the stresses of sudden contraction caused by filling with a cryogenic fluid.

Still another object of the present invention is to provide a cryogenic container having internal insulation in which contamination of the contents of the container is prevented.

These and other objects and a more complete understanding of the invention may be had by reference to the accompanying description and claims taken in conjunction with the accompanying drawings in which:

Figure 1:
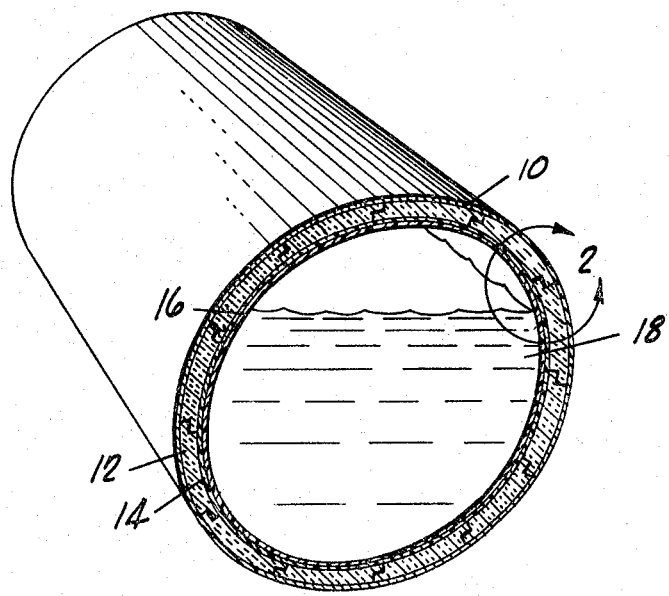
FIG. 1 is a pictorial, sectional view of a cryogenic container constructed in accordance with the present invention shown proportionally distorted for clarity.
Figure 2:
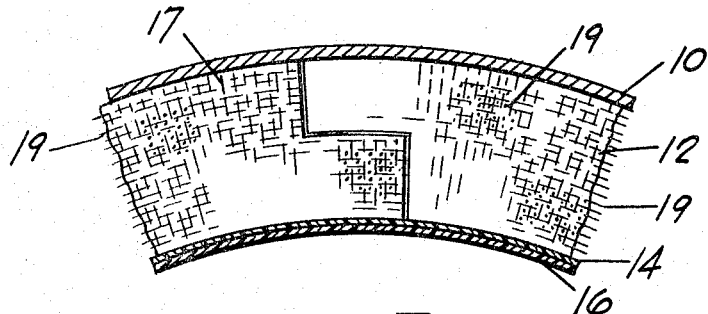
FIG. 2 is an enlarged view of area 2 of FIG. 1 showing a sectional view of the wall of the container.

The container shown in FIG. 1 comprises an outer tank or shell 10 of generally metallic construction, foam insulation panels 12 bonded to the inside wall of the shell 10, a lining 14 bonded to the inside surface of the panels 12, and a sealant 16 coated on the inside of the lining 14. A very cold liquid 18 such as liquid hydrogen is held by the container which insulates it from the heat of the surroundings.

The shell 10 is the major structural member of the container and serves to support the weight of the insulation and cryogenic fluid therein and transmit it to supporting braces or other structures which hold the container. Accordingly, the shell 10 is of structural thickness and is constructed of a rigid material such as aluminum or steel.

The insulation panels 12 are made of any suitable insulation material such as polyurethane foam or other foam material. These panels are contoured to the inside of the shell so that they may be bonded to it. In order to strengthen the foam insulation and to better enable its bonding to the shell 10 reinforcing threads 17 of braided fine spun glass such as Fiberglas, which is the trademark of the Owens-Corning Fiberglas Corporation for products made of fine glass fibers, are provided within the insulation 12, the threads extending in a radial direction from the liner 14 to the inside of the tank 10. The ends of the Fiberglas threads protrude from radially opposite sides of the foam panels 12 so that the opposite ends of each thread extend therefrom and are adjacent the tank 10 and the liner 14. The insulation panels 12 are bonded to the inside of the shell 10 by a gluing agent such as an epoxy adhesive.

The edges of each panel are indented or stepped and the adjacent panels are joined at their edges by gluing. The layer of glue is generally kept thin because a glue path is a much poorer insulator than the foam insulation. The provision of a step at the edge of each panel provides for a longer glue path and thereby reduces heat leaks.

The Fiberglas liner 14 is essentially a shell woven of Fiberglas strands, and it is bonded to the inside of the panels 12. The ends of the reinforcing threads 17 opposite those bonded to the tank 10, are bonded to the outer surface of the liner 14. The liner serves as a support for the liquid contained in the cryogenic container and as a means for transmitting the weight of the liquid to the foam insulation 12 and the shell 10. Additionally, the liner prevents the contamination of contained fluid by dust from the insulation material where such friable materials as polyurethane foam or other foam materials are used.

The liner comprises strips of cloth woven of Fiberglas strands and impregnated with epoxy resin. Each portion of the liner is installed by applying a layer of epoxy resin to the inner surface of the insulation panels 12, laying a strip of Fiberglas cloth on the resin, and applying epoxy resin on the cloth. A resin impregnated Fiberglas liner is thus obtained which is bonded to the foam insulation and the Fiberglas threads therein.

A sealant 16 is sprayed or otherwise applied to the inside of the liner 14. The purpose of the sealant is to retard the diffusion of gases from the contained liquid through the liner 14 and into the foam insulation 12, which would otherwise lower the insulation capabilities of the foam. An appropriate sealant also protects the inside surface of the tank against fungus and rotting. The choice of sealant 16 is determined by the particular cryogenic liquids to be contained. For the containment of liquid hydrogen a polyurethane resin seal may be used.

When a cryogenic liquid is first poured into the container, the inner portions thereof such as the seal 16, liner 14 and inner portions of the foam 12 suddenly contract. In the absence of the liner 14 which holds the inner part of the foam together, the inner foam would ordinarily crack. Although the liner 14 contracts when it is suddenly cooled, it is very tough and can undergo considerable contraction before it is overstressed. The liner is bonded to the foam and causes the foam to follow its movements. Accordingly if the liner does not tear, the foam cannot spread apart and crack. The Fiberglas liner 14 also possesses the desirable quality of having a low coefficient of expansion and contraction so that it contracts relatively little when greatly cooled.

The coefficient of expansion of foam insulation is approximately $12 \times 10^{-6}$ inches per inch per °F. while the coefficient for Fiberglas is approximately 6 to $8 \times 10^{-12}$. Thus is can be seen that the Fiberglas liner contracts less than the foam and reduces the total contraction of the foam, in addition to holding it together. Perhaps the major advantage of the Fiberglas liner is that it has great toughness, which means that it resists stretching while being capable of stretching to a great extent without tearing. A comparison with aluminum which is often used as a tank material shows the advantage of the Fiberglas liner, in that the liner can be stretched several times as much without tearing while possessing approximately as high a yield strength. Furthermore, Fiberglas has a low heat conductivity so that heat is not readily conducted from any heat leak to the surrounding areas.

When the inner portions of the foam 12 are suddenly cooled they are drawn radially inwardly and tend to tear the foam panels away from the tank 10 or crack and break them into layers. The Fiberglas threads 17 whose ends are bonded to the inner surface of the tank 10 and the outer surface of the liner 14 help to prevent this. The Fiberglas threads are much stronger than the foam and can withstand great tensile stresses. Accordingly, the threads resist radially inward movement of the liner 14 and inner portions of the foam insulation 12, thereby preventing the formation of cracks and layering.

As mentioned hereinabove the foam is reinforced in a radial direction because of the large contractual stresses produced when the inside of the container is suddenly cooled. However, as the inside tends to contract, circumferential stresses are also produced, and it is desirable to strengthen the foam against these stresses to prevent cracking and layering in any direction. For this reason a grid of Fiberglas threads 19 is provided which extends in a circumferential direction, or in other words, perpendicular to the radial threads. Inasmuch as the stresses in the circumferential direction are expected to be smaller than those in a radial direction, the circumferentially extending threads are finer and, of course, weaker.

Figure 3:
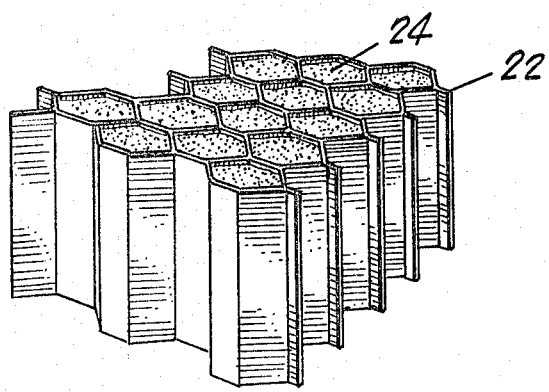
FIG. 3 is a partial pictorial view of a foam panel as used in the present invention, in which a honeycomb system is used as a support structure.

One alternative support structure for strengthening the foam or other insulation and holding the liner to the shell is a phenolic honeycomb arrangement, as shown in FIG. 3. In this arrangement, kraft paper impregnated with phenolic resin and formed into a honeycomb 22 is filled with polyurethane foam 24 so that the kraft paper edges protrude slightly. A honeycomb support is generally a poorer insulator and is somewhat weaker than the Fiberglas threaded structure, but is also much less expensive. It is therefore useful for cryogenic containers wherein cost is an important factor and insulation properties are not critical. Other support structures of substantially non-heat-conducting or very low heat conductivity materials extending between the outer shell and the liner and joined to them may be used also.

As previously noted, almost any structurally sound metal shell or tank may be used as the supporting shell 10. The insulation 12 may be made of any of various insulation materials which can withstand the stresses of sudden contraction such as balsa wood with its grain oriented in a radial direction. However, polyurethane foam has been found to be the best insulator of the many kinds tested, especially for applications requiring low weight. When polyurethane foam is reinforced with Fiberglas threads in the manner described, it possesses sufficient strength for use as a reliable insulation in cryogenic containers.

Choosing a proper material for the liner 14 is among the most important requirements for assuring a sound container of the type described. Materials such as metals which are commonly used to contain liquids do not possess sufficient flexibility and toughness to withstand the changes in dimensions and stresses encountered when they are suddenly cooled to cryogenic temperatures. A Fiberglas liner possesses the necessary toughness and, furthermore, possesses a coefficient of expansion which results in little contraction and low stresses.

The impregnated Fiberglas liner is a sufficient barrier for some types of cryogenic fluids but there are many which will diffuse through it. Accordingly, a seal is provided within the liner to retard diffusion. An adequate seal for many types of cryogenic fluids, including hydrogen, is polyurethane resin. This material may be sprayed onto the inside of the liner and it will adhere and serve as a diffusion seal. Other materials such as the halogenated hydrocarbons: Mylar, Acklar, and Teflon; the elastosilicon rubbers; and epoxy materials may be used. It is also possible to incorporate the sealant in the material of the liner instead of spraying it thereon.

Although the invention has been described in connection with use in cryogenic containers, it is also useful as an insulating system for pipes, non-cryogenic vessels, and other insulated structures. Furthermore, although a particular embodiment has been shown, many alterations and substitutions of materials and their arrangements may be made in the practice of the invention. Accordingly, it is desired to emphasize the fact that many modifications may be resorted to in a manner limited only by a just interpretation of the following claims.

We claim:

1. An internally insulated fluid holding structure comprising:

a rigid outer structural shell;

a foam insulation layer bonded to the internal surface of said shell;

a liquid-tight impermeable, liner of a flexible material attached to the interior surface of said insulation layer; and multiple support elements of substantially non-heat conducting material extending between and connected to said shell and said liner, said multiple support elements are radially positioned threads extending through said foam insulation layer and having ends joined to said shell and liner, said threads dispursed throughout at least a portion of said insulation layer, said threads being of a sufficient length to diameter ratio that they have substantially no column strength.

2. An internally insulated fluid holding structure as defined in claim 1 including a grid-like system of fibers positioned substantially perpendicular to said radial threads.

3. An internally insulated fluid holding structure comprising:
- a rigid outer structural shell;
- an insulation layer bonded to the internal surface of said shell, said layer being constructed of a material having a predetermined coefficient of expansion at cryogenic temperatures;
- a liquid-tight impermeable liner of a flexible material attached to the interior surface of said insulation layer, said liner being constructed of a material having a predetermined coefficient of expansion at cryogenic temperatures which is less than said coefficient or expansion at cryogenic temperatures of said insulation material; and
- multiple support elements of substantially non-heat conducting material extending between and connected to said shell and said liner.

4. An internally insulated fluid holding structure as defined in claim 3 wherein said insulation is a foam and said liner is a layer of woven glass fiber cloth impregnated with resin.

5. A cryogenic container comprising:
- an outer metal tank of structural thickness;
- a plurality of joined panels bonded to the inner surface of said tank, each of said panels comprising a multiplicity of braided glass fiber threads arranged substantially perpendicular and imbedded in a matrix of foam, wherein the ends of fibers extending between the faces of said panels protrude therefrom;
- a liner of woven glass fibers impregnated with epoxy resin bonded to the inner surface of said panels; and
- a sealant coating on the inner surface of said liner.

References Cited by the Examiner

UNITED STATES PATENTS

| | | | |
|---|---|---|---|
| 2,744,042 | 5/1956 | Pace | 220—9 |
| 2,863,797 | 12/1958 | Meyer | 220—9 |
| 2,922,733 | 1/1960 | Henning | 161—93 |
| 3,003,810 | 10/1961 | Kloote et al. | 220—9 |
| 3,013,922 | 12/1961 | Fisher | 220—9 |
| 3,029,967 | 4/1962 | Morrison | 220—9 |
| 3,061,497 | 10/1962 | Wilson et al. | |
| 3,079,026 | 2/1963 | Dosker | 220—9 |

FOREIGN PATENTS 610,488   12/1960   Canada.

BENJAMIN A. BORCHELT, *Primary Examiner.*

SAMUEL FEINBERG, *Examiner.*

G. L. PETERSON, G. H. GLANZMAN,
*Assistant Examiners.*